UNITED STATES PATENT OFFICE.

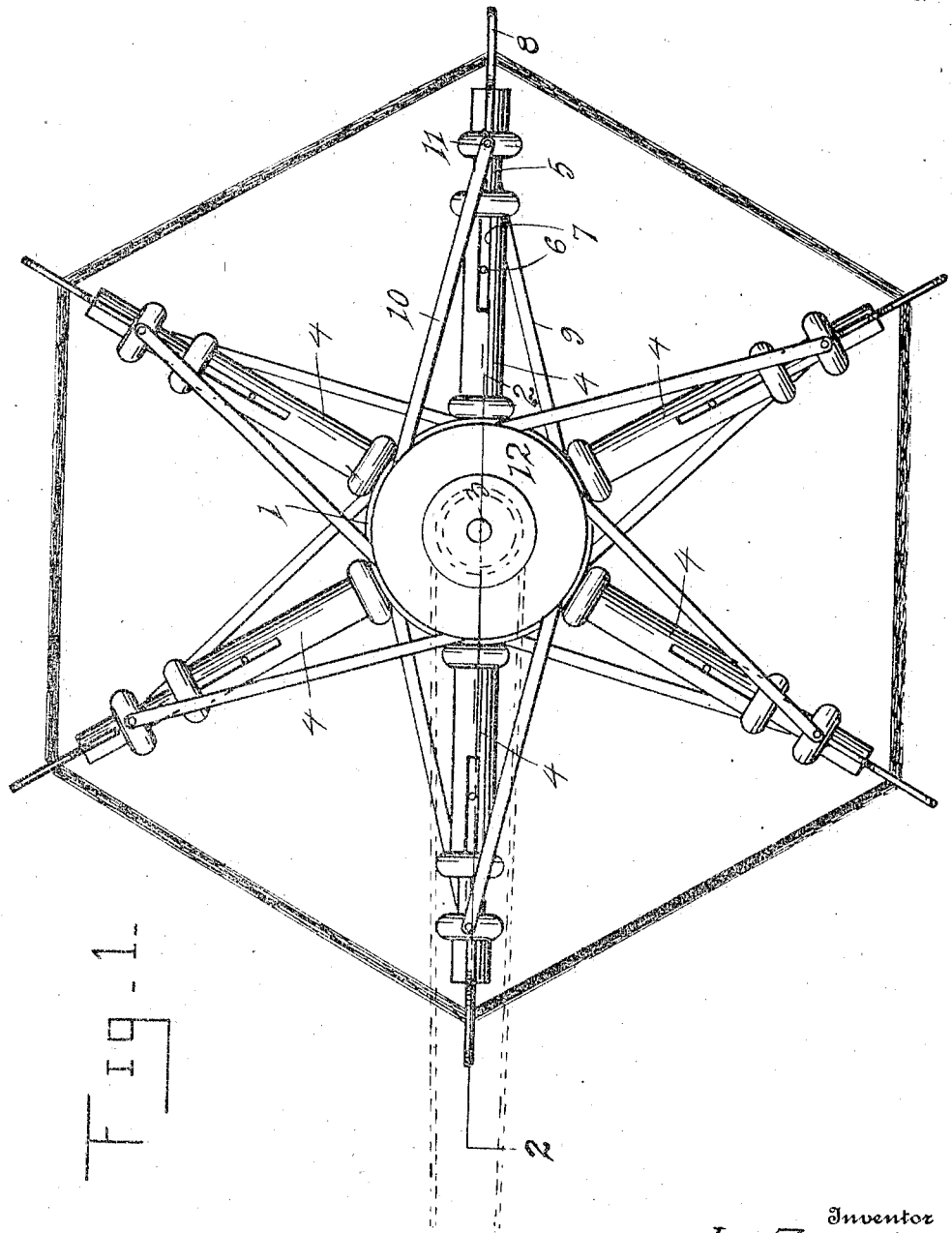

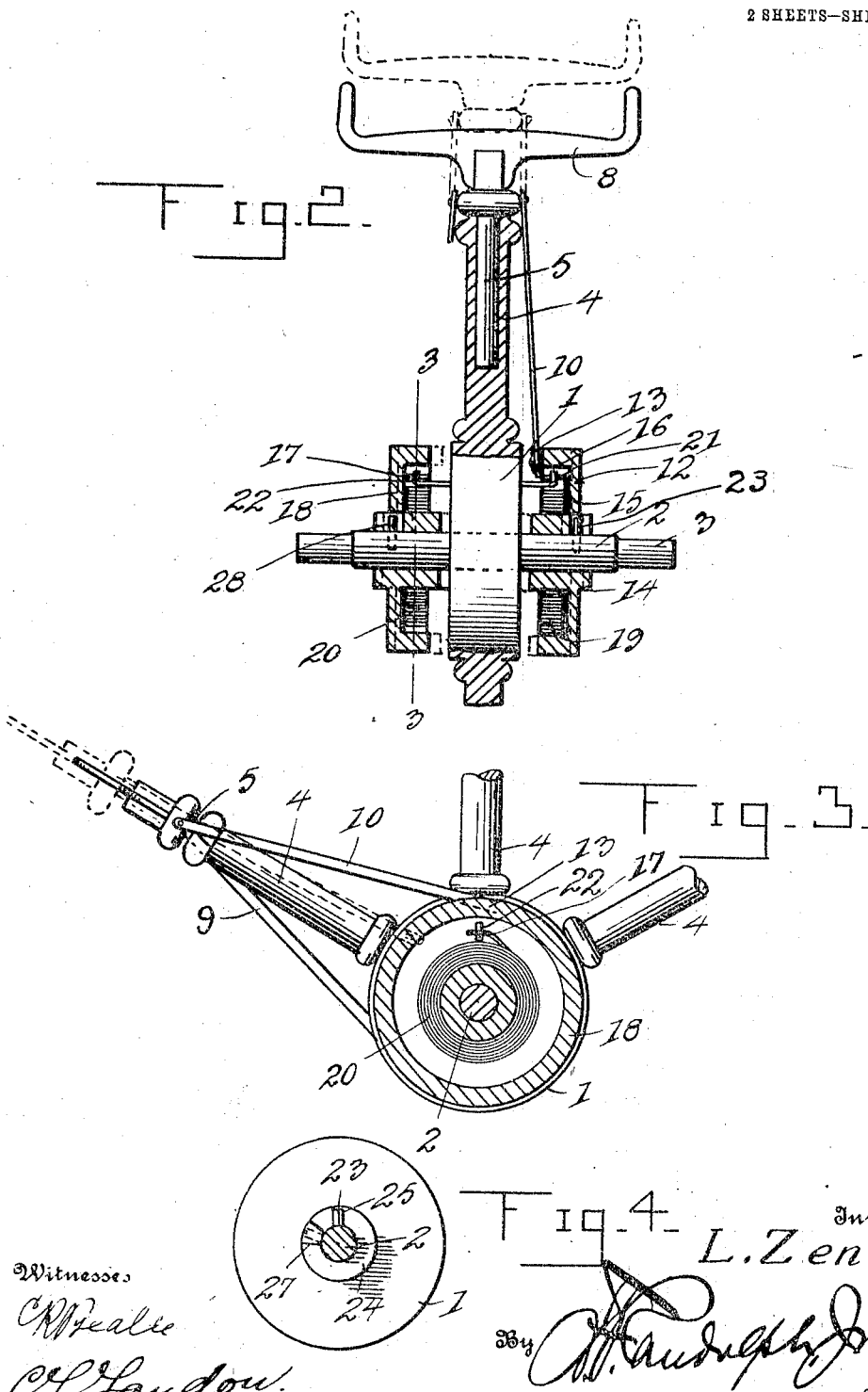

LORENZO ZENI, OF SCRANTON, PENNSYLVANIA.

EXPANDING CARRIER-SPOOL.

1,113,082.

Specification of Letters Patent.

Patented Oct. 6, 1914.

Application filed July 10, 1913. Serial No. 778,353.

*To all whom it may concern:*

Be it known that I, LORENZO ZENI, a citizen of the United States, residing at Scranton, in the county of Lackawanna and State of Pennsylvania, have invented certain new and useful Improvements in Expanding Carrier-Spools; and I do hereby declare the following to be a full, clear, and exact description of the invention, such as will enable others skilled in the art to which it appertains to make and use the same.

This invention relates to new and useful improvements in carrier spools for devices such as are employed in rotatably supporting skeins of silk thread, while they are being unwound.

The particular object of this invention contemplates the provision of a carrier spool equipped with a plurality of radial spokes, each of which is provided with a slidable spring pressed spoke head.

A further object is to provide means for drawing in the spoke heads to produce a reduced circumference of the spool, so that the skein may be placed on the spool and the spoke heads then released, so that by action of the spokes pivotally connected to them, the spoke heads will then be extended, increasing the diameter of the spool so that all play or slack in the skein is taken up.

A still further object is to provide a simple device for locking the spoke heads in reduced position.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts: Figure 1 is a side elevation of the carrier spool illustrating the spring pressed rods in extended position. Fig. 2 is a section on the line 2—2 of Fig. 1. Fig. 3 is a section on the line 3—3 of Fig. 2. Fig. 4 is a detail view of the locking device employed in holding the spring pressed rods in contracted position.

Proceeding now to the description of the drawings, the numeral 1 designates the hub of the spool which is keyed on the spindle 2, the terminals of which are reduced in the usual manner as at 3. A plurality of radial spokes 4 are carried on the hub 1 and are provided at their outer free ends with longitudinally extending bores in which are slidably mounted rods or plungers 5. The members 5 are limited for sliding movement in the bores by laterally extending pins 6, which operate in longitudinal slots 7 formed in the member 4. Each of the members 5 is headed and carries a U-shaped head 8 which is formed of any desired type of light metal and is designed to receive the skein of silk or thread.

As a means for normally holding the members 5 in extended position, there has been provided two sets of link members, the individual faces of one series being designated by the numeral 9, and the individual faces of the other series being designated by the numeral 10. The members 9 and 10 are arranged in a manner similar to the spokes of an ordinary bicycle wheel. The members 10 are all arranged on one side of the hub, while the members 9 are all arranged on the other side of the hub. Each of the members 10 is pivotally connected at its upper terminal to one of the headed portions 8 of a member 5 as at 11, and is pivoted at its other terminal to a cup member 12, by a pivot pin 13. The member 12 includes a hub 14, a disk plate 15 and an annular rim or flange 16. The cup is arranged with its flange 16 adjacent the hub 1 of the spool. The members 9 are connected in a similar manner at their upper terminals to the headed portions 8 of the members 5, and are connected at their lower terminals to the pins 17 carried interiorly of the disk plate of a cup member 18, similar in construction to the member 12 arranged on the opposite side of the hub.

Interiorly of the cup members 12 and 18 are arranged a pair of coil springs, respectively designated by the numerals 19 and 20. The inner terminals of the coil springs are secured to the hub portions of the cups and are connected at their outer terminals by pins 21 and 22 carried on opposite sides of the hub edge and respectively projecting into the cups 12 and 18. The springs are designed to normally hold the members 9 and 10, and consequently the members 5 in extended position, and are also designed to hold the members 5 into contracted position when the cup members 12 and 18 are rotated in opposite directions against the tension of the springs 19 and 20. As a means for holding the cup members in adjusted position against the tension of the springs 19 and 20, when the members 5 are drawn into the spokes 4 in adjusted position, there has been provided a pin 23 carried on the spindle 2 and extending radially therefrom.

A collar 24, a segment of which is cut away, as indicated in Fig. 4, is fixed on the outer face of the disk plate 15 and is arranged for rotation on the spindle 2. The pin 23 normally abuts the edge 25 of the collar 24, but is designed to be inserted in a recess formed in the plate 15, when the cup 12 has been rotated through an approximate arc of 90 degrees. The other terminal 27 of the collar 24 limits, in conjunction with the terminal 25, the movement of the cup 12 by engagement with the pin 23. In locking the cup 12 in adjusted position against the tension of the spring 19, the pin 23 is inserted in the recess, it obviously follows that when the pin 23 is seated in the recess, the cup 12 will be held against rotation. A similar device, designated as an entirety by the numeral 28, is provided for the cup 18, and need not be described in detail.

From the foregoing, the operation of the device will be apparent. When applying the skein of silk to the spokes, it is only necessary to rotate the cup members 12 and 18 in opposite directions with the resultant reduction of the circumference of the spool as described by a circle passing through the spoke heads 8. When the skein is slipped into the spoke heads 8, the members 12 and 18 are released and the springs 19 and 20 again force the members 5 out, thus increasing the circumference of the spool and taking up all slack in the skein.

Relative to the many advantages resident in the novel form of structure employed in this invention, it is desirable to emphasize the fact that this spool may be employed with any size of threaded skein by merely changing the length of the spokes, or varying the length of the slits therein. The variation in the circumference of the spool comprehended by the various spoke heads, may also be accomplished by employing spoke rods of different lengths. It has been found desirable in practice to have several sets of spoke rods of different lengths, so that they may be readily enlarged when the operator desires to place skeins of different size on the spool. As regards the advantages of this spool, it is also to be observed that the knotting of the thread or silk is effectively guarded against by reason of the fact that there is no slack whatever, due to the action of the springs which tend to keep the rods in extended position.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus described my invention, what I claim is:

1. A carrier spool including a spindle, a hub keyed thereon, radial spokes carried by said hub, rods slidable in the outer terminals of said spokes, a U-shaped head for each of said rods, a pair of cup members rotatably mounted on said spindle and arranged on opposite sides of said hub, coil springs arranged interiorly of said cups and operatively connecting said cups and said hubs, and means operatively connecting said cups to said rods, said means being adapted to draw in the said rods reducing the circumference of the spool when the said cups are operatively rotated against the tension of the said springs.

2. A carrier spool comprising a spindle, a hub keyed thereon, radial spokes carried by said hub, skein receiving means slidable in the outer terminals of said spokes, a pair of cup members rotatably mounted on said spindle and arranged on opposite sides of said hub, coil springs arranged interiorly of said cups and operatively connected with said cups and said hub and means operatively connecting said cups to said skein receiving means and arranged to draw in said skein receiving means whereby the circumference of the spool is reduced when said cups are operatively rotated against the tension of said springs.

3. A carrier spool including a spindle, a hub keyed thereon, spokes carried by said hub, skein receiving means slidable in the free terminals of said spokes, a pair of cup members rotatably mounted on said spindle upon opposite sides of said hub, coil springs mounted interiorly of said cups and having their terminals operatively connected with said spindle and the cups, and links operatively connecting the skein receiving means with said cups and adapted to draw in said rods reducing the circumference of the spools when said cups are operatively rotated against the tension of said springs.

LORENZO ZENI.

Witnesses:
L. MAGNATHE,
E. M. LETTIERI.